Sept. 6, 1960

J. T. A. VAN LOTTUM ET AL

ARRANGEMENT FOR AUTOMATIC SIGNALLING SYSTEM INTENDED FOR TRANSMITTING VOICE-FREQUENCY CALLING SIGNALS 2,951,911

Filed March 10, 1958

2 Sheets-Sheet 1

INVENTOR
JOHANNES THEODORUS ANTONIUS VAN LOTTUM
JACOBUS DOMBURG
ARIE FERDINAND VERKRUISSEN
BY
AGENT

Sept. 6, 1960 J. T. A. VAN LOTTUM ET AL 2,951,911

ARRANGEMENT FOR AUTOMATIC SIGNALLING SYSTEM INTENDED FOR TRANSMITTING VOICE-FREQUENCY CALLING SIGNALS

Filed March 10, 1958

2 Sheets-Sheet 2

INVENTOR
JOHANNES THEODORUS ANTONIUS VAN LOTTUM
JACOBUS DOMBURG
ARIE FERDINAND VERKRUISSEN
BY
Frank R. Jifari
AGENT United States Patent Office 2,951,911
Patented Sept. 6, 1960

2,951,911

ARRANGEMENT FOR AUTOMATIC SIGNALLING SYSTEM INTENDED FOR TRANSMITTING VOICE-FREQUENCY CALLING SIGNALS

Johannes Theodorus Antonius van Lottum, Jacobus Domburg, and Arie Ferdinand Verkruissen, all of Eindhoven, Netherlands, assignors to North American Philips Company, Inc., New York, N.Y., a corporation of Delaware Filed Mar. 10, 1958, Ser. No. 720,365

Claims priority, application Netherlands Mar. 14, 1957

7 Claims. (Cl. 179—90)

This invention relates to arrangements for automatic signalling systems, for example telephone systems, for transmitting voice-frequency calling signals via a communication line, for example from a subscriber's set to a register in a telephone exchange.

Arrangements are already known in which for supplying a damped calling signal to a subscriber's line use is made of an oscillatory circuit which is coupled to the subscriber's line and which can be tuned to different frequencies by means of calling contacts, the oscillation energy being derived from an impedance, for example a capacitor or an inductance, which forms part of the oscillatory circuit and in which a certain amount of electrical or magnetic energy is accumulated. In known arrangements of this kind, use is made for this purpose of an inductance which, normally, is traversed by direct current, the calling signals being produced by interrupting the direct-current circuit extending via the inductance and the communication line. Known arrangements have the disadvantage that the presence of such an impedance, which is to be connected in series or parallel to the handset circuit, causes the telephone currents to be damped to a fairly great extent.

The present invention mitigates this disadvantage. In the arrangement according to the invention, use is made of an inductance having a centre tapping, one half of the inductance in the speaking condition, that is to say if no calling signal is transmitted, being connected in series with the direct-current circuit extending via the communication line and the microtelephone circuit, whilst the two extremities of the inductance are connected together by means of a capacitor having a low impedance for telephone currents.

Since the telephone currents in the two halves of the inductance counteract each other with regard to magnetization, the additional damping resulting from the presence of the inductance is very low. In the arrangement according to the invetnion, the oscillatory circuit is preferably included between the base and the collector of a transistor during the transmission of calling signals, the collector and the emitter of this transistor being connected to the line wires. In one particularly advantageous embodiment of an arrangement according to the invention, the number of frequencies to which the oscillatory circuit can be tuned is less than the number of calling figures to be distinguished and for calling determined figures the capacitor, during the interruption of the direct-current circuit, being switched by means of a calling contact, via a high-ohmic resistor, between the line wires in a manner such that, after completion of the direct-current circuit, an additional oscillation is produced in the oscillatory circuit comprising the inductance and the capacitor, the signal receiver comprising means for detecting this oscillation.

In order that the invention may be more readily carried into effect, one embodiment will now be described more fully, by way of example, with reference to the accompanying drawings, in which—

Figure 1:
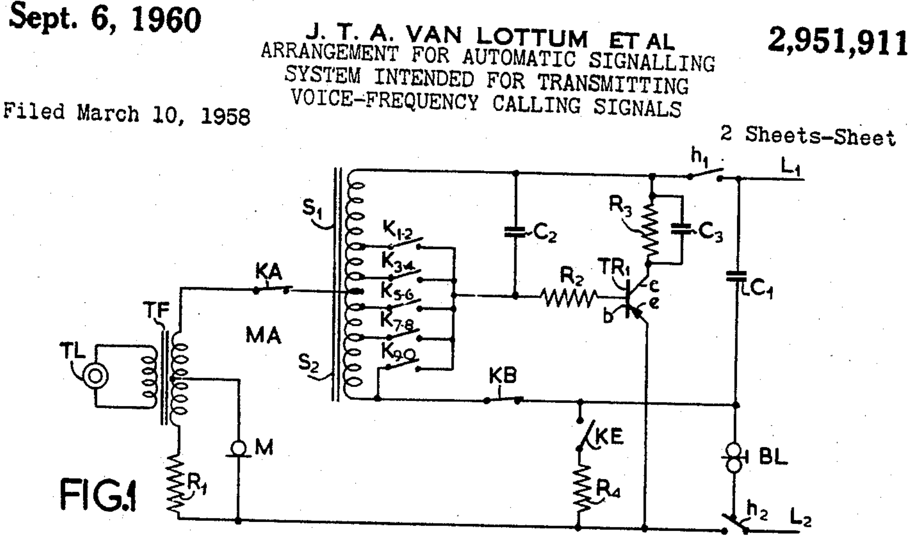
Fig. 1 shows the arrangement of a subscriber's set for transmitting calling signals.

The subscriber's set shown in Fig. 1 comprises a telephone TL and a microphone M, which are included in known manner with the aid of a transformer TF and a resistor R1 in an anti-sidetone circuit. The contacts *h*1 and *h*2 are switch hooks, which are shown in the position in which the handset is inoperative and the bell BL is connected in series with a capacitor C1, via make contact *h*2, between line wires L1 and L2 so that the subscriber may be rung in known manner by means of an alternating voltage on the line. The arrangement for transmitting calling signals includes an inductance S, the value of which is, for exanmple, 1H ad which has a centre tap MA. In the speaking condition, in which the receiver is taken off, a direct current flows through line wire L1, switch hook *h*1, the half S1 of inductance S, contact KA, the microphone circuit, make contact *h*2 and line wire L2, so that a certain amount of magnetic energy is stored in the inductance S. The part of this circuit which comprises the winding S1 and contact *h*1 is bridged for telephone currents by a winding S2, back contact KB and capacitor C1, the latter having a low impedance for telephone currents and having a value of, for example, 2/$\mu$fs. Since the telephone currents in the windings S1 and S2 counteract each other with regard to magnetization, the presence of the inductance S causes only a low damping of the telephone currents. The subscriber's set also has 10 push buttons (not shown), which control the calling contacts K12, K34, K56, K78 and K90, by means of which the capacitor C2 may be connected to different tappings on the inductance S. The push buttons corresponding to the calling digits 1 and 2 control the contact K12, the buttons corresponding to the digits 3 and 4 control the contact K34, the buttons corresponding to the digits 5 and 6 control the contact K56, the buttons corresponding to the digits 7 and 8 control the contact K78 and the buttons corresponding to the digits 9 and 0 control the contact K90. The push buttons also control the common contacts KA and KB in a manner such that contact KA is opened only after contact KB has been opened and one of the contacts K12 . . . K90 closed. Furthermore the buttons corresponding to the even digits 0, 2, 4, 6 and 8 control a common contact KE.

This arrangement operates as follows:

When one of the push buttons is depressed, capacitor C2, as previously mentioned, is connected in parallel to part of the inductance S, resulting in an oscillatory circuit being formed, the frequency of which depends upon the digit chosen. Contact KB interrupts the connection between inductance S and capacitor C1. Subsequently, contact KA interrupts the above-described direct-current circuit via winding S1, so that an oscillation produced in said oscillatory circuit is transferred via a transistor TR1 to the subscriber's line L1, L2. The base *b* of the transistor is connected via resistor R2 to the capacitor C2, its emitter *e* is connected via make contact *h*2 to conductor L2, and its collector *c* is connected via a current-limiting resistor R3, bridged by a capacitor C3, and make contact *h*1 to the line wire L1. In this arrangement in which the oscillation to be amplified is supplied between the base and the collector of the transistor (which arrangement is in certain cases referred to as a "common collector circuit") the input resistance of the base is very high. The oscillatory circuit is thus damped only slightly and the frequency produced is in practice independent of the properties of the line due to the oscillatory circuit being coupled to the line only very loosely. The strong decrease in direct current across the subscriber's line indicates in the telephone exchange that there is called and that a device must be made operative for determining the frequency of the calling oscillation. During calling, the microphone M is not connected to the subscriber's line, so that the calling signal cannot be disturbed by telephone currents. In the depressed condition, of the calling button, a certain direct current continues to flow via resistor R3 and transistor TR1, thus preventing the communication from being interrupted in the telephone exchange.

It would fundamentally have been possible to distinguish the 10 digits to be called in the described manner by means of 10 different frequencies. However, in order to obtain wider tolerances, the number of frequencies is in this case limited to five and use has been made of an additional criterion for distinguishing between the even digits and the odd digits. As previously mentioned, the calling contact KE is closed when an even digit is called. Consequently, capacitor C1 charges during the calling period via a high-ohmic resistor R4 to the voltage of the line, so that upon release of the push button, whereby at first contact KA and subsequently contact KB closes, an oscillation is produced in the oscillatory circuit including inductance S, make contact *h*1, capacitor C1 and back contact KB. This oscillation occurs after the direct-current path via the subscriber's set is again closed and may thus be distinguished from the calling oscillation proper in the exchange. When an odd digit is called, this additional oscillation does not occur.

Figure 2:
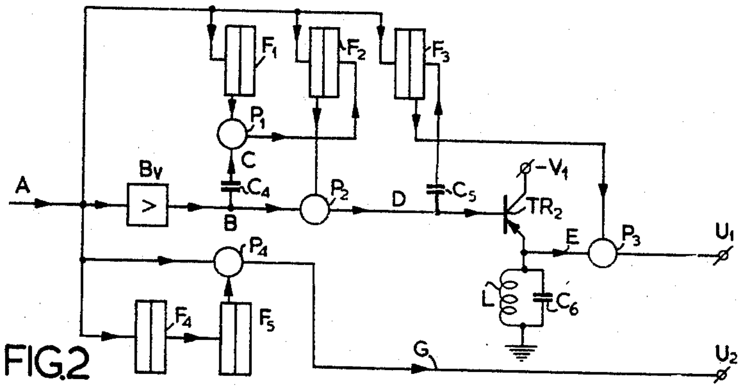
Figs. 2 and 3 show parts of a telephone exchange for receiving these signals, and Fig. 4 relates to a number of voltage-time diagrams.
Figure 4:
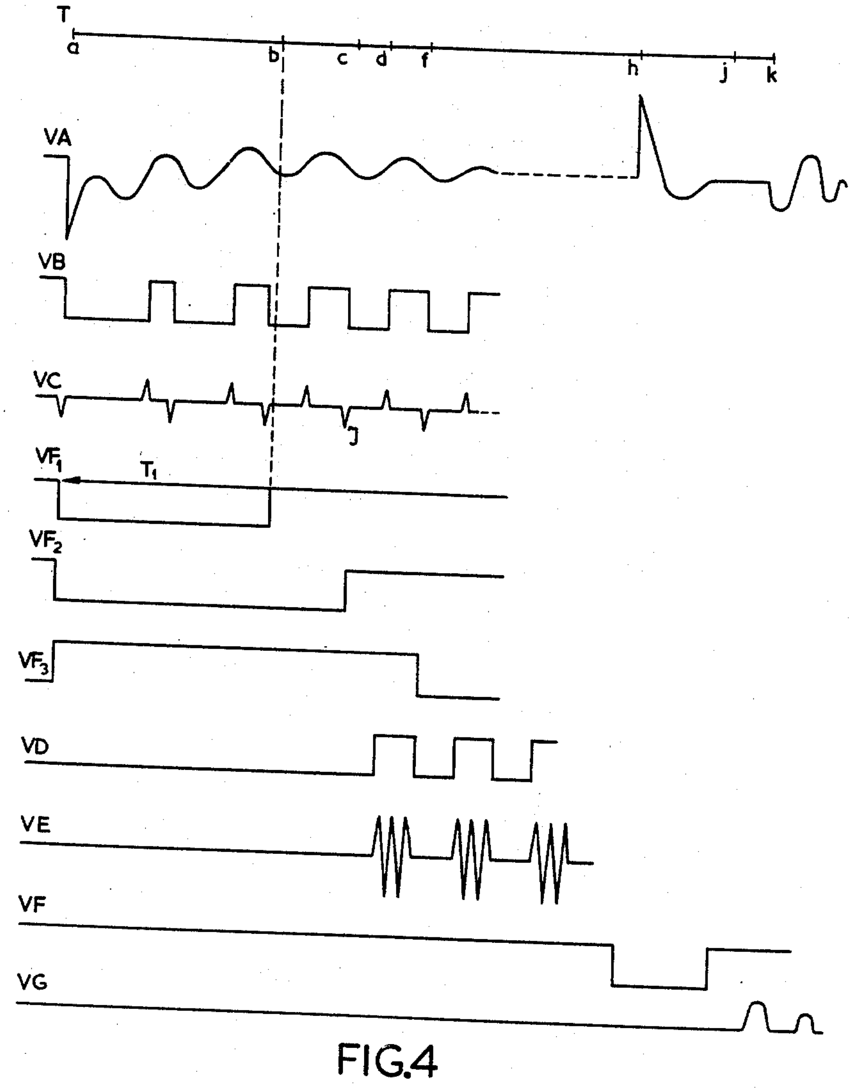

The calling signals are supplied in the exchange, in a manner not shown, to the conductor A of the arrangement shown in Fig. 2, resulting in a voltage which varies with time as represented by the curve VA of Fig. 4. When a calling button on the subscriber's set is depressed at the moment *a*, the direct-current circuit via the subscriber's set is interrupted and a strong negative pulse occurs at point A. The disappearance of the direct current results in a swinging-out phenomenon via the subscriber's line and hence in an interfering oscillation which interferes with the calling oscillation, but which is damped to a much greater extent than the latter. The over-controlled amplifier BV changes the voltage at point A to a block voltage at point B, such as represented by the curve VB of Fig. 4. The amplitude of this block voltage is substantially independent of the damping of the oscillations caused by the line. The duration of the half periods of the block voltage is still influenced by the interfering oscillation during the first moments as may appear from the curve VB. In order to eliminate the influence of this interfering oscillation the arrangement is so designed that the frequency of the calling oscillation is determined only at a moment when the interfering oscillation has substantially disappeared. The strong negative pulse at point A brings the mono-stable trigger circuits F1, F2, F3 from the rest condition into their operating condition. The trigger circuits are so adjusted that they cannot be influenced by the weaker calling oscillations which follow afterwards. The trigger circuits F1 and F2 control gate circuits P1 and P2, respectively, in a manner such that they are cut off in the operating condition of the circuits, whereas the trigger circuit F3 controls a gate circuit P3 in a manner such that it is conducting in the operating condition of the trigger circuit. The block voltage at point B is differentiated by a capacitor C4, resulting in pulses at point C, the variation of which is represented as a function of time by the curve VC of Fig. 4.

After a certain period, which is sufficient for unwanted oscillation on the subscriber's line to be damped away, the trigger circuit F1 returns independently to the rest condition at the moment *b*, so that the gate circuit P1 is opened and transmits the pulses to the trigger circuit F2 which, by the action of the next-following negative pulse I, returns to the rest condition at the moment *c* and opens gate circuit P2. The gate circuit P2 passes the positive periods of the block voltage VB of Fig. 4, so that a block voltage occurs at point D. Such as represented by the curve VD of Fig. 4.

In the arrangement shown, the frequency of the calling oscillations is determined by measuring the duration of a half wave of said oscillations. For this purpose, the arrangement comprises an oscillatory circuit, constituted by an inductance L and a capacitor C6, which is included in the emitter circuit of a transistor TR2. The collector of this transistor is connected to a voltage source —V1 and its base is connected to the output of the gate circuit P2, so that the transistor, normally, is conducting and an amount of magnetic energy is accumulated in the inductance L. The transistor TR2 is cut off during the positive periods of the block voltage at point D, resulting in an oscillation across the oscillatory circuit LC6, which is suddenly damped very strongly at the end of the positive period when transistor TR2 again becomes conducting. From this ensues a voltage at point E, such as represented by curve VE of Fig. 4. The gate circuit P3 transfers this oscillation to conductor U1 during the first positive period of the voltage at point D (that is to say during the time between the moments *d* and *f*, corresponding to the measuring period proper) which conductor U1 is connected to conductor U1 of Fig. 3. At the moment *f*, capacitor C5 transfers a pulse to the trigger circuit F3, which thus returns to its rest condition and closes the gate P3, so that the latter does not supply any further oscillations to conductor U1. The frequencies of the calling oscillations are chosen in connection with the natural frequency of the oscillatory circuit LC6 so that during the measuring period the gate circuit P3 passes one pulse at the highest calling frequency, passes two pulses at the second-highest calling frequency, etc. The number of pulses being passed is measured by the arrangement of Fig. 3 in a manner which will be described hereinafter.

When the calling button on the subscriber's set is released at the moment *h*, at first the contact KA in the subscriber's set closes, resulting in the direct-current circuit via the subscriber's line being closed and a strong positive pulse occurring at point A of the arrangement of Fig. 2, which pulse is usually accompanied by an interfering oscillation upon discharge of the subscriber's line, which oscillation is strongly damped. A short time afterwards, the relevant calling contact K12 or K34, etc. in the subscriber's set opens and contact KB closes. If an odd digit were chosen, nothing happens at all. If, however, an even digit were chosen, then capacitor C1 is charged via make contact KE and resistor R4, so that upon closure of contact KB a low-frequency oscillation is produced in the oscillatory circuit constituted by inductance S, contact KB, capacitor C1 and make contact *h*1, which oscillation is transferred via the handset circuit to the subscriber's line and at the moment *k* gives rise to an additional oscillation at point A of the arrangement of Fig. 2. The strong positive pulse at the moment *h* brings the monostable trigger circuit F4 into its operating condition. After a certain period, which is sufficient for the interfering oscillation on the subscriber's line to be damped away, the trigger circuit F4 returns independently to the rest condition at the moment *j*, transmitting a pulse to the monostable trigger circuit F5, which, in its turn, changes over to the operating condition, opens the gate P4 and, after a certain period, returns independently to the rest condition. The gate circuit P4 is so adjusted that comparatively weak oscillations, such as telephone currents are not passed. If an even digit were chosen, the gate circuit P4 transmits the additional oscillation to the conductor U2 such as represented by the curve VG in Fig. 4.

Figure 3:
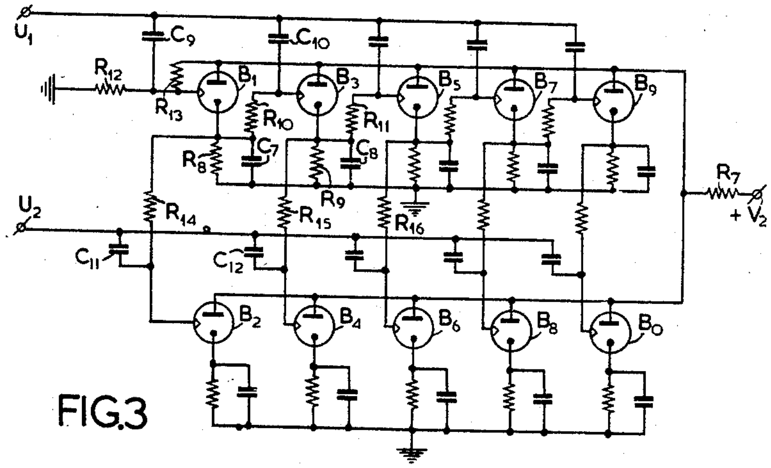

The pulses to be passed by the gate P3 are counted by the arrangement shown in Fig. 3, which comprises a counting circuit having a plurality of gas tubes B1, B3, B5, B7 and B9 for registering the odd digits and a register circuit having gas tubes B2, B4, B6, B8 and B0 for registering the even digits. The counting circuit is designed in a manner known per se. The anodes of the various tubes are connected via a common resistor R7 to a source of positive potential V2, their cathode circuits including individual resistors R8, R9, etc., bridged by capacitors C7, C8, etc. The ignition electrodes of the tubes B3, B5, etc., of the counting circuit are each connected via resistors R10, R11, etc., to the cathode of the preceding tube. The ignition electrode of tube B1 is connected to a tapping on the potentiometer R12, R13, R7, so that in the rest condition of the circuit, in which all tubes are extinguished, this ignition electrode has a voltage which is higher than the voltage on the ignition electrodes of the other tubes of the counting circuit and a little lower than the ignition voltage. The pulses to be counted are supplied via conductor U1 and capacitors C9, C10, etc., to the ignition electrodes B1, B3, etc., of the counting circuit. This circuit arrangement operates as follows:

The first pulse causes ignition of tube B1. The second pulse ignites tube B3, since the voltage of its ignition electrode at this moment is higher than that of the other ignition electrodes, whilst tube B1 extinguishes as a result of the negative pulse which occurs on its anode. Similarly, the third pulse ignites tube B5, etc. The ignition electrodes of the tubes B2, B4, B6, B8 and B0 are each connected via resistors R14, R15, etc., to the cathode of a tube of the counting circuit and connected via capacitors C11, C12, etc., to the conductor U2. If, for example, the digit 5 is chosen, the counting circuit receives three pulses so that ultimately only tube B5 is conducting. If the digit 6 were chosen, the counting circuit also receives three pulses and tube B5 becomes conducting. In this case, however, as previously mentioned, after release of the calling button, additional pulses are supplied to conductor U2, so that tube B6 ignited due to its ignition electrode, which is connected via resistor R16 to the cathode of tube B5, having a biassing potential which is a little lower than the ignition voltage. Furthermore, tube B5 extinguishes upon ignition of tube B6 under the action of the negative pulse on its anode. When an even digit is chosen, one of the tubes B2, B4, B6, B8 and B0 thus becomes conducting to indicate the digit chosen.

What is claimed is:

1. An automatic signalling system for transmitting calling signals over a communication line comprising transducer circuit means, oscillatory circuit means for generating calling signals, said oscillatory circuit means comprising center tapped frequency determining inductance means, capacitor means, first switch means connecting said capacitor means in parallel with said inductance means during conditions of speech transmission, and second switch means serially connecting said transducer circuit means between the center tap and one end of one-half of said inductance means during conditions of speech transmission.

2. An automatic signalling system for transmitting voice-frequency calling signals over a two wire communication line comprising transducer circuit means, oscillatory circuit means for generating calling signals, said oscillatory circuit means comprising inductance means having a plurality of taps, first capacitor means, and first switch means selectively connecting said first capacitor to said taps to effect the selective generation of calling signals of different frequencies, a center tap on said inductance means, second capacitor means, second switch means connecting said second capacitor means in parallel with said inductance means during conditions of speech transmission, and third switch means serially connecting said transducer circuit means and one-half of said inductance means between said center tap and one end thereof during conditions of speech transmission.

3. An automatic signalling system for transmitting voice-frequency calling signals over a two wire communication line of the type normally traversed by a direct voltage under speech transmission conditions comprising transducer circuit means, oscillatory circuit means for generating calling signals, said oscillatory circuit means comprising inductance means having a plurality of taps, first capacitor means, first switch means selectively connecting said first capacitor means to said taps to effect the generation of calling signals of different frequencies, and amplifier circuit means having an output circuit connected to said line, a center tap on said inductance means, second capacitor means, second switch means connecting said second capacitor means in parallel with said inductance means during conditions of speech transmission, said transducer circuit means comprising microphone means and telephone means, third switch means serially connecting said transducer circuit means and one-half of said inductance means between said center tap and one end thereof in series with said communication line during conditions of speech transmission.

4. The system of claim 3, in which said amplifier circuit comprises a transistor, said first capacitor being connected between the collector and base of said transistor, and the collector and emitter of said transistor being connected to opposite wires of said communication line.

5. In the system of claim 4, resistor means, and fourth switch means serially connecting said resistor means and second capacitor means between the wires of said communication line, said fourth switch means being mechanically coupled to said first switch means and being closed only when said first capacitor means is connected to predetermined taps on said inductance means so that when said second switch means connects said second capacitor means in parallel with said inductance means a damped oscillation occurs having a frequency determined by said second capacitor means and said inductance means.

6. The system of claim 3, in which signal receiving means is connected to said communication line, said signal receiving means comprising detector means for detecting said damped oscillation, and gate circuit means for transmitting said oscillation to said detector means a predetermined time after closing of said third switch means.

7. An automatic telephone system comprising a two wire communication line, inductance means having a center tap, transducer means having one terminal connected to one wire of said line, one end of said inductance means being connected to the other wire of said line, first and second capacitor means, switch means having first contacts connecting said first capacitor means in parallel with at least a portion of said inductance means, second contacts connecting said second capacitor in parallel with said inductance means, and third contacts connected between said center tap and the other terminal of said transducer means, and amplifier means having an input circuit connected in parallel with said first capacitor means and an output circuit connected between said communication line wires, said first contacts being closed during calling conditions and open during speech transmission conditions, and said second and third contacts being closed during speech transmission conditions and opened during calling conditions.

References Cited in the file of this patent

UNITED STATES PATENTS 2,732,432 Hullegard ____________ Jan. 24, 1956